United States Patent Office 3,011,942
Patented Dec. 5, 1961

3,011,942
IMPROVEMENT OF THE WATER SOLUBILITY OF KERATIN PROTECTING SUBSTANCES
Wilhelm Ernst Frick, Pfeffingen, and Guido Schetty and Walter Stammbach, Basel, Switzerland, assignors to J. R. Geigy A.-G., Basel, Switzerland
No Drawing. Filed Aug. 18, 1959, Ser. No. 834,416
Claims priority, application Switzerland Aug. 26, 1958
5 Claims. (Cl. 167—37)

The present invention concerns a process for improving the water solubility of active substances which draw onto the fibre and protect keratin fibres from attack and decomposition by injurious insects in all stages of their development, in particular against moth larvae. It also corcerns the protective agents for keratin material obtained by this process.

Insofar as the water solubility of these moth proofing agents permits, treatment liquors are preferably prepared by first producing stock solutions of the corresponding active substances which are then added to the treatment baths. In practice, these stock solutions should be used for the preparation of a fairly large number of liquors and, therefore, they should be both stable and also have as high a concentration as possible in order to facilitate the handling and storing thereof. The known active ingredients for the protection of keratin fibres from injury by moths, for example, diphenyl ether derivatives such as 4.4' - dichloro - 2' - (3".4" - dichlorophenyl ureido)-diphenyl ether-2-sulphonic acid and salts thereof, or triphenyl methane derivatives such as 2'.2"-dihydroxy-4.3'.5'.3".5" - pentachlorotriphenyl methane-2-sulphonic acid and salts thereof however, are generally only relatively slightly soluble in water so that either the use of stock solutions has to be dispensed with or they are of such a large volume that they are difficult to handle.

It has now been found that the water solubility of such sulpho-group containing protective substances for keratin material can be considerably increased if, as solubility promoters, amides of aliphatic carboxylic or sulphonic acids corresponding to the general formula

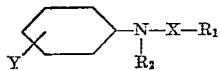   (I)

are used. In this formula

R₁ represents a lower alkyl radical,
R₂ represents hydrogen, a lower alkyl radical or a lower hydroxyalkyl radical,
Y represents hydrogen, a lower alkyl or alkoxy radical or a halogen atom, and
X represents CO or SO₂.

In general, these solubility promoters are used in amounts of from 20–200% of the sulpho-group containing active ingredient to be dissolved. Advantageously the active substances and solubility promoters are thoroughly mixed before dissolving. As mothproofing agents which are easier to use, such mixtures are also a subject of the present invention as well as their preparation by mixing the two components.

Two typical sulpho-group containing active ingredients the solubility of which can be improved by the process described, have already been named, namely 4.4'-dichloro-2' - (3".4" - dichlorophenylureido) - diphenyl ether - 2-sulphonic acid and 2'.2" - dihydroxy - 4.3'.5'.3".5"-pentachlorotriphenylmethane - 2 - sulphonic acid. Apart from these, the solubility can be improved of other substances which protect keratin material, for example, 4.4'-dichloro - 2' - (3" - trifluoromethyl - 4" - chlorureido)-diphenyl ether-2-sulphonic acid as well as ethers of triphenyl methane derivatives, in particular the cyclic ethers which are described in German Patents 877,764 and 943,167.

Suitable solubility promoters are carboxylic acid amides and sulphonic acid amides of the general Formula I in which R₂ is a lower molecular alkyl radical and Y represents a lower molecular alkyl or alkoxy radical or a halogen atom such as, e.g. N-methyl acetanilide, N-methyl-aceto-toluidides or mixtures thereof, N-ethyl-aceto - p - anisidide, N - ethyl - p - chloro - acetanilide, N-methyl - propionanilide and N - methyl - methane sulphonic acid anilide. N-methyl acetanilide is preferred for economic reasons.

In many cases however, a considerable increase in the solubility can be attained with amides in which R₂ is hydrogen or a lower molecular hydroxyalkyl radical such as, e.g. acetanilide, aceto-toluidides, propionanilide or N-(β-hydroxyethyl)-acetanilide.

The following examples illustrate the invention without, however, limiting it to the examples described. Parts are given therein as parts by weight. The temperatures are in degrees centigrade.

Example 1

1 part of the compound of the formula

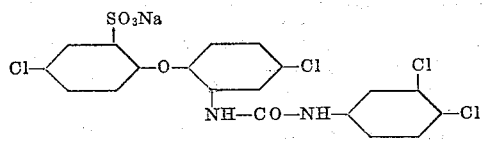

is thoroughly mixed with 1 part of N-methyl acetanilide. On pouring 2–3 parts of water of 95° or 8–10 parts of water of 85° onto this mixture, a clear solution is obtained. In contrast to this, a mixture of 1 part of the same active substance and 1 part of the usual diluting agent, for example, urea, is only soluble with about 30 parts of water at 95° and with even about 50 parts of water at 85°.

On cooling the solutions, that diluted with urea produces a crystal slurry which can only be again dissolved with difficulty whereas on using N-methyl acetanilide, a gel is formed which is easily liquified again on warming.

Example 2

1 part of the compound

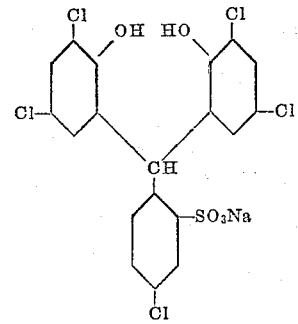

is thoroughly mixed with 1 part of N-methyl acetanilide. This mixture already dissolves in water of 15° in a ratio of 1:1 whilst on using urea instead of N-methyl acetanilide, at least 10–15 parts of water of 95° are needed to attain a clear solution.

What we claim is:
1. A process for the production of protective agents for keratin material having improved water solubility, which comprises mixing a compound selected from the group consisting of 4.4'-dichloro-2'-(3".4"-dichlorophenylureido)-diphenyl ether-2-sulfonic acid, 2'.2"-dihydroxy-4.3'.5'.3".5" - pentachlorotriphenylmethane - 2 - sulfonic acid, and 4.4' - dichloro - 2' - (3" - trifluoromethyl-

4″ - chloroureido) - diphenyl ether - 2 - sulfonic acid, with 20 to 200%, calculated relative to the weight of said compound, of an amide of the formula

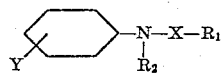

wherein
$R_1$ is a lower alkyl radical,
$R_2$ represents a member selected from the group consisting of hydrogen, lower alkyl radicals and lower hydroxyalkyl radicals,
Y represents a member selected from the group consisting of hydrogen, lower alkyl radicals, lower alkoxy radicals and halogen atoms, and
X represents a member selected from the group consisting of —CO— and —SO₂— radicals.

2. A process according to claim 1, wherein the amide is N-methyl acetanilide.

3. A keratin protecting composition with improved water solubility which contains as essential ingredients at least one member selected from the group consisting of 4.4′ - dichloro - 2′ - (3″.4″ - dichlorophenylureido) - diphenyl ether-2-sulfonic acid, 2′.2″-dihydroxy-4.3′.5′.3″.5″ - pentachlorotriphenylmethane - 2 -sulfonic acid, and 4.4′ - dichloro - 2′ - (3″ - trifluoromethyl - 4″ - chloroureido) - diphenyl ether - 2 - sulfonic acid, and at least one amide of the general formula

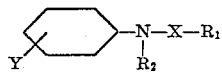

wherein
$R_1$ is a lower alkyl radical,
$R_2$ represents a member selected from the group consisting of hydrogen, lower alkyl radicals and lower hydroxyalkyl radicals,
Y represents a member selected from the group consisting of hydrogen, lower alkyl radicals, lower alkoxy radicals and halogen atoms, and
X represents a member selected from the group consisting of —CO— and —SO₂— radicals, the quantity of amide amounting to 20 to 200% of the weight of said compound.

4. A keratin protecting composition which contains as essential ingredient a compound selected from the group consisting of 4.4′ - dichloro - 2′ - (3″.4″ - dichlorophenylureido)-diphenyl ether-2-sulphonic acid and the salts thereof, and 20 to 200% of the weight of said compound of an amide of the general formula

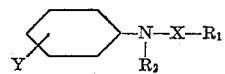

wherein
$R_1$ is a lower alkyl radical,
$R_2$ represents a member selected from the group consisting of hydrogen, lower alkyl radicals and lower hydroxyalkyl radicals,
Y represents a member selected from the group consisting of hydrogen, lower alkyl radicals, lower alkoxy radicals and halogen atoms, and
X represents a member selected from the group consisting of —CO— and —SO₂— radicals.

5. A composition according to claim 4, wherein the amide is N-methyl acetanilide.

References Cited in the file of this patent
UNITED STATES PATENTS
1,962,276    Huismann _____ June 12, 1937